A. L. HARVEY.
MOTOR CONTROL SYSTEM.
APPLICATION FILED NOV. 7, 1917.
1,406,377.
Patented Feb. 14, 1922.
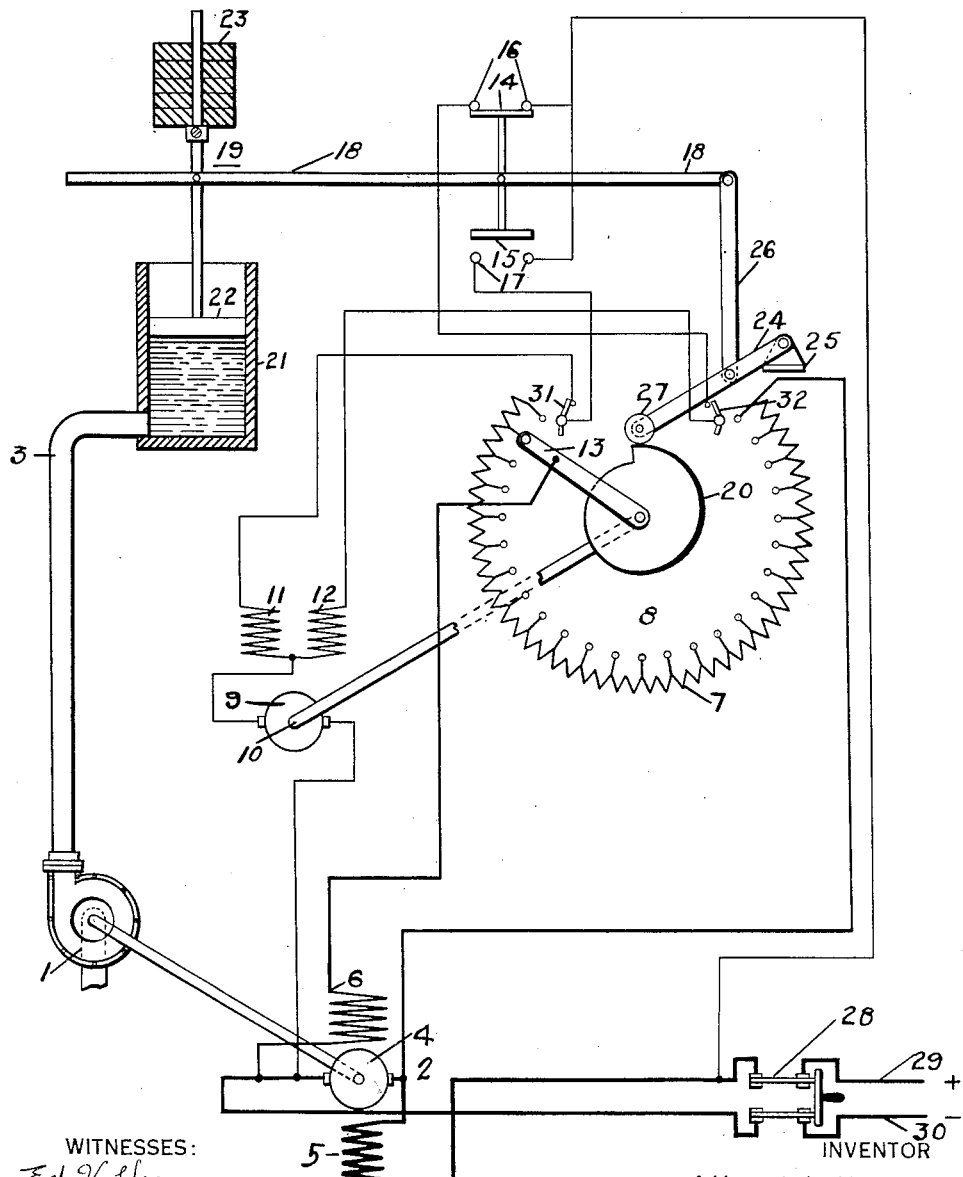
WITNESSES:
Ed. V. Herron
W. B. Wells.
INVENTOR
Albert L. Harvey
BY
Wesley G. Carr
ATTORNEY

UNITED STATES PATENT OFFICE.

ALBERT L. HARVEY, OF BRADDOCK TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,406,377.    Specification of Letters Patent.    Patented Feb. 14, 1922.

Application filed November 7, 1917. Serial No. 200,662.

*To all whom it may concern:*

Be it known that I, ALBERT L. HARVEY, a citizen of the United States, and a resident of Braddock Township, in the county of Allegheny and State of Pennsylvania, have invented a new and useful Improvement in Motor-Control Systems, of which the following is a specification.

My invention relates to systems of control and particularly to systems of control that serve for governing the operation of fluid systems.

One object of my invention is to provide a system of control of the above-indicated character that shall automatically govern the operation of a fluid system in a manner to maintain a uniform pressure therein.

In a fluid system, such, for example, as a hydraulic system for rolling-mill work, it is essential for efficient operation of the various fluid-controlled pieces of apparatus associated with the fluid system that the pressure therein be maintained substantially constant and uniform.

In a control system constructed in accordance with my invention, a pilot motor, which governs the operation of a rheostat, is operated in a forward and in a reverse direction in accordance with the pressure of the fluid system. The rheostat, which is operated by the pilot motor, is in circuit with the shunt field winding of the motor for operating the pump that supplies pressure to the fluid system. Thus, the speed of the motor-propelled pump is governed in accordance with the pressure in the fluid system.

The single figure of the accompanying drawing is a diagrammatic view of a system of control constructed in accordance with my invention.

Referring to the accompanying drawing, a fluid pump 1 is connected to a motor 2 and is operated thereby to maintain pressure in a fluid system 3. The motor 2 embodies an armature 4, a series field winding 5 and a shunt field winding 6 which is included in circuit with the resistor 7 of a rheostat 8. A pilot motor 9, which embodies an armature 10 and differential field windings 11 and 12, is connected to the contact arm 13 of the rheostat 8 and serves to rotate the same in a forward and in a reverse direction.

The circuit of the pilot motor 9 is directly controlled by two switch members 14 and 15 which are adapted to bridge contact terminals 16 and 17, under predetermined conditions, as will be set forth hereinafter. The contact members 14 and 15 are connected to a rod 18 which is adapted to be controlled by a fluid-operated device 19 and a cam member 20 which is rigidly connected to the contact arm 13 of the rheostat 8.

The fluid-operated device 19 embodies a dash-pot 21, which is directly connected to the fluid system 3, a plunger 22 which operates within the dash-pot 21 and a weight 23 for counterbalancing the fluid pressure within the dash-pot 21. The plunger 22 is pivotally connected to the rod 18, near one end thereof, in any suitable manner. A lever 24, which is fulcrumed near one end thereof to a stationary support 25, is pivotally connected, by a link 26, to the rod 18 in order to maintain a floating fulcrum for the rod 18. A roller 27, which is mounted near one end of the lever 24, is maintained in contact with the periphery of the cam member 20 in order to operate the contact members 14 and 15 in accordance with the position of the contact arm 13. A switch 28 is provided for connecting the motors 2 and 9 to the supply conductors 29 and 30.

Assuming the system to be in the condition illustrated in the drawing, with such pressure in the fluid system as to operate the device 19 and bridge the contact terminals 16 by the contact member 14, a circuit is completed for operating the pilot motor 9 and rheostat 8 in a manner to reduce the speed of the motor 2 and the pump 1. The circuit completed by the contact member 14 is traced from the positive supply conductor 29 through the switch 28, contact terminals 16, which are bridged by the contact member 14, limit switch 32, field winding 12, armature 10 and the switch 28 to the negative supply conductor 30. The pilot motor 9 is operated in a manner to give the contact arm 13 a movement of rotation in a counterclockwise direction and thus reduce the portion of the resistor 7 that is included in circuit with the shunt field winding 6. It will be noted, however, that, as the contact arm 13 is rotated in a counter-clockwise direction, the cam member 20 is operated in a manner to lower the floating fulcrum of the rod 18 and break the contact between the member 14 and contact terminals 16 and thus prevent further rotation of the contact arm 13. It is necessary to provide auxiliary means, such as the cam member 20 and the parts associated therewith, for stopping the operation of the pilot motor 9 in order to prevent over-travel of the contact arm 13, inasmuch as there is a time interval between the movement of the contact arm 13 and a corresponding pressure change in the fluid system 3. Thus, if the cam member 20 were not provided in the system, the pressure within the fluid system 3 would be reduced somewhat below normal before the pilot motor 9 would be stopped by the action of the fluid-operated device 19.

In case the pressure within the fluid system 3 is lowered below normal, then the fluid-operated device 19 is operated in a manner to bridge the contact terminals 17, by means of contact member 15, and thus complete a circuit from the supply conductors 29 and 30 through the field winding 11 of the pilot motor 9. In this case, the pilot motor 9 will be operated in a manner to rotate the contact arm 13 in a clockwise direction and increase the portion of the resistor 7 included in circuit with the field winding 6 of the motor 2. Moreover, in the case under consideration, the cam member 20 is rotated in a manner to raise the floating fulcrum of the rod 18 and thus open the circuit of the pilot motor 9 after a limited rotation of the contact arm 13 in a clockwise direction. If sufficient resistance is not included in circuit with the field winding 6, the fluid-operated device 19 is again operated to complete the circuit of the pilot motor 9.

The limit switches 31 and 32, which are associated with the rheostat 8, are operated in a customary manner by the contact arm 13 in order to prevent over-travel of the same.

Modifications in the system and arrangement and location of parts may be made within the spirit and scope of my invention, and such modifications are intended to be covered by the appended claims.

I claim as my invention:

1. In a fluid system, a rheostat, a pilot motor for governing the operation of the rheostat, means controlled by the pressure in the fluid system for controlling the operation of the pilot motor in a forward and in a reverse direction and means for rendering said controlling means ineffective when said pilot motor occupies any predetermined position and for rendering said controlling means again effective when said pilot motor occupies said predetermined position.

2. The combination with a rheostat having a rotatable contact arm, and a pilot motor connected to the rheostat arm, of a fluid system, a fluid device operated in accordance with the pressure in the fluid system, a contact arm connected to the fluid device for controlling the operation of the pilot motor in accordance with the pressure in the fluid system and means controlled in accordance with the position of said pilot motor for controlling said contact arm.

3. The combination with a rheostat having a movable member and electroresponsive means for governing the operation thereof, of a fluid system, and means controlled in accordance with the pressure in the fluid system for controlling the operation of said governing means, and means operable in accordance with the position of said movable member to modify the effect of variation of pressure in said system.

4. The combination with a rheostat having a rotatable contact arm, a pilot motor having oppositely wound field windings for giving the contact arm a rotative movement in a forward and in a reverse direction, and a cam member rotatable with said contact arm, of a fluid system, and means controlled by the pressure in the fluid system and by said cam member for selectively energizing the pilot motor to control the operation of the rheostat.

5. In a fluid system, the combination with a fluid pump and a main motor connected thereto for maintaining pressure in the fluid system, and a rheostat for controlling the excitation of said motor, of a pilot motor for governing the operation of the rheostat, and means controlled by the pressure in the fluid system and the position of said pilot motor for operating the pilot motor in a forward and in a reverse direction to govern the operation of said rheostat.

6. In a fluid system, the combination with a fluid pump and a main motor for maintaining pressure in the fluid system, a rheostat having a contact arm included in circuit with the main-motor field winding, a cam member rotatable with said contact arm, and a pilot motor having a set of oppositely wound field windings for giving said contact arm and the cam member associated therewith, a rotative movement in a forward and in a reverse direction, of means controlled by the pressure in the fluid system and by said cam member for selectively operating the pilot motor to govern the operation of the main motor.

7. The combination with a rheostat having a rotatable contact arm and a cam member rotatable with the contact arm, and a pilot motor having oppositely wound field windings for rotating said contact arm and the associated cam member in a forward and in a reverse direction, of a fluid system, contact members for completing circuits through the motor field windings, and means controlled by the pressure in the fluid system and by said cam member for operating said contact member to selectively operate the pilot motor.

In testimony whereof, I have hereunto subscribed my name this 24th day of Oct., 1917.

ALBERT L. HARVEY.